United States Patent [19]

Romanski

[11] Patent Number: 4,812,185

[45] Date of Patent: Mar. 14, 1989

[54] METHOD OF MAKING A PAPER MACHINE PRESS BELT

[75] Inventor: Eric R. Romanski, Delmar, N.Y.

[73] Assignee: Albany International Corp., Menands, N.Y.

[21] Appl. No.: 83,689

[22] Filed: Aug. 7, 1987

[51] Int. Cl.$^4$ .................. F16G 1/16; B65H 81/00
[52] U.S. Cl. .................. 156/86; 156/141; 156/188; 156/190; 474/266
[58] Field of Search .................. 156/86, 137, 139–142, 156/149, 184–185, 187–188, 190, 195, 212–213, 294; 162/358, DIG. 1; 474/266, 268; 198/846, 957

[56] References Cited

U.S. PATENT DOCUMENTS

| | | | |
|---|---|---|---|
| 1,611,830 | 12/1926 | Freedlander | 156/188 X |
| 2,652,093 | 9/1953 | Burton | 156/86 |
| 2,773,540 | 12/1956 | Waugh | 156/142 X |
| 2,995,176 | 8/1961 | Waugh | 156/141 |
| 3,752,719 | 8/1973 | Borden | 156/86 X |
| 4,231,826 | 11/1980 | Wrast et al. | 156/140 X |
| 4,559,258 | 12/1985 | Kiuchi | 162/358 X |

Primary Examiner—Michael W. Ball
Assistant Examiner—David W. Herb
Attorney, Agent, or Firm—Kane, Dalsimer, Sullivan, Kurucz, Levy, Eisele and Richard

[57] ABSTRACT

A method for making a belt for use in papermaking includes a series of steps. A sheet of uncured urethane is wrapped on a polished mandrel. A woven fabric sleeve to serve as a supporting carcass is placed over the first sheet and shrunk onto it. A second sheet of uncured urethane is placed over the woven fabric sleeve. A nylon web is wrapped tightly around the second layer and the entire wrapped mandrel is heated, curing the urethane sheets and entirely bonding the sheets to encapsulate the fabric sleeve. The nylon wrap is removed and the surface of the cured urethane is ground.

7 Claims, 3 Drawing Sheets

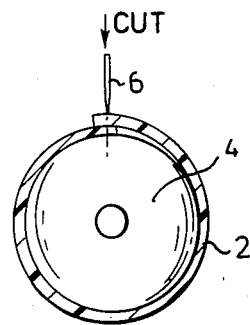
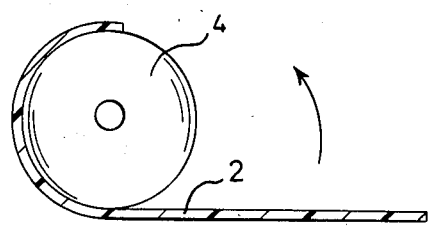
FIG.2    FIG.1
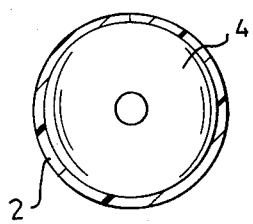
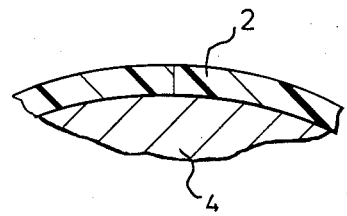
FIG.3    FIG.4
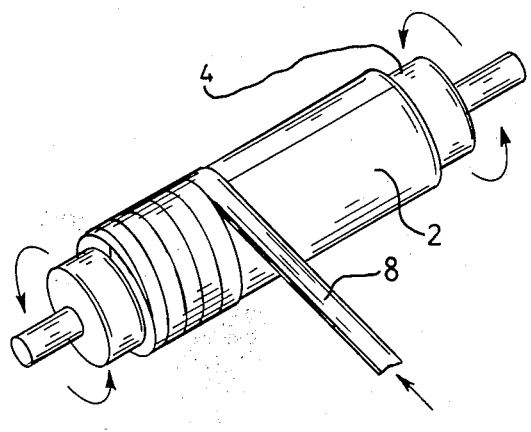
FIG.5
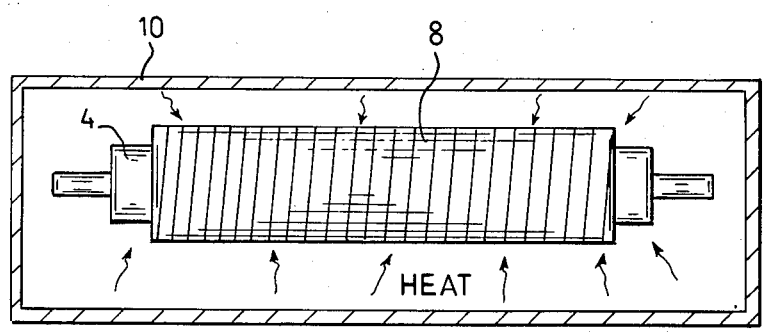
FIG.6

METHOD OF MAKING A PAPER MACHINE PRESS BELT

BACKGROUND OF THE INVENTION

1. Field of The Invention

The field of the invention relates to methods for making impermeable belts with smooth inner surfaces and more particularly a belt used in an extended nip press for dewatering a fibrous web formed in a papermaking machine.

2. Description of the Prior Art

Extended nip presses are currently used in the papermaking industry in the formation of paper and kraft products. Many presses of this type use an endless, impervious, oil, abrasion and crush resistant belt which runs against the shoe in the press nip. Early designs used long belts in the range of 25 to 50 feet.

More recent extended nip press designs have been scaled down in size and require belts of much shorter lengths. These recent press designs generally incorporate a circular belt configuration, in the shape of a drum, circumscribing the nip, rather than an expanded rectangular belt configuration as was used in the early designs.

The long belts used on earlier designed machines are made endless and are impregnated with a tough thermoset resin.

The coated surface is then ground to a uniform thickness and polished smooth. The belt is then inverted so the smooth impregnated surface is on the inside. Since during manufacture the outside of the belt is polished, and since it is the inside of the belt which must be smooth for communicating with an oil lubricated press shoe, inversion of the belt is necessary. With the development of the new extended nip presses, the length of belt has been reduced to 13 to 15 feet. Because of this reduced length the previous means of manufacture is inappropriate because a belt of such short length cannot be readily inverted. Not only is the process of inverting a short relatively brittle belt very difficult (if not impossible) but the stresses upon the belt in inverting it could create weak points in the belt leading to failure during use. The extended nip press requires that the belt be uniform in thickness and with the inner surface polished smooth so that it can ride on the oil lubricated pressure shoe which acts as a hydraulic bearing.

Belts used in extended nip presses generally require some sort of fiber reinforcement to withstand the tremendous pressures of up to 6,000 pounds per linear inch in operation. See e.g. U.S. Pat. No. 4,229,253. A belt commonly includes a base fabric or carcass coated with a resinous material. Uniformity of belt thickness as well as uniformity of level of carcass depth within the coating are essential in belts of this type. Processes for coating the carcass usually include the use of two rolls, one tension roll and one drive roll, and a coating or impregnation device. A method for forming a reinforced plastic belt loop is disclosed in U.S. Pat. No. 4,267,139 which involves placing an endless shrinkable carcass in a mold, then filling the mold with a casting plastic. The woven structure is then encapsulated in the cured plastic. A drawback of a belt made by this process is that the carcass, in order to achieve uniform depth within the coating, must be set to contact the inner support core of the mold. Consequently, in the final product, the carcass is disposed adjacent to the internal surface of the belt.

SUMMARY OF THE INVENTION

The present invention solves the problem in the prior art resulting from inverting the endless belt after manufacture and insures that the belt thickness is uniform and the inner surface is smooth.

Uncured sheet polyurethane is wrapped around a smooth mandrel with a highly polished surface. A woven fabric carcass is placed over the sheet polyurethane. A second layer of sheet polyurethane is then wrapped around the fabric carcass. Next a narrow nylon webbing is wrapped thereon and the wrapped mandrel is placed in an autoclave for curing the sheet polyurethane. The urethane cures and bonds entirely to itself and encapsulates the endless bare fabric.

A primary advantage of using the present invention is that it provides a convenient and efficient method of encapsulating a woven fabric sleeve so that the belts produced are reinforced in both machine direction and cross machine direction. Prior art belts stable only in machine direction have not been commercially or operationally successful in use on extended nip presses.

Another advantage is that the belt need not be inverted since the inner surface of the belt is smooth as a result of using a mandrel having a highly polished surface.

A further advantage is that no expensive mold equipment is necessary for the present method. In addition, the belts produced are long lasting and provide quality performance.

BRIEF DESCRIPTION OF THE DRAWINGS

FIG. 1 is a side section view illustrating rolling a sheet of uncured polyurethane onto a mandrel.

FIG. 2 is a side section view illustrating cutting an overlapping portion of the sheet of FIG. 1.

FIG. 3 is a side section view illustrating the sheet of FIGS. 1 and 2 after cutting.

FIG. 4 is a close-up view of abutment of the edges of the sheet as shown in FIG. 3.

FIG. 5 is a perspective view illustrating wrapping a nylon web over the covered mandrel of FIG. 3.

FIG. 6 is a side view illustrating placement of the covered mandrel of FIG. 5 in a heating means.

DETAILED DESCRIPTION OF THE PREFERRED EMBODIMENT

Figure 7:
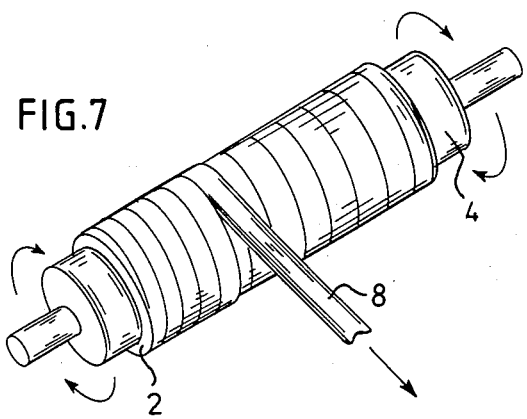
FIG. 7 is a perspective view illustrating unwrapping the nylon web after heating.

In FIG. 1 sheet 2 is shown being wrapped around building mandrel 4 which is mounted on a shaft 6. Sheet 2 is preferably composed of uncured urethane, more preferably uncured polyurethane. The building mandrel 4 has a highly polished surface. A portion of sheet 2 overlaps itself after winding as shown in FIG. 2. A cut is made by cutter 6 through the under and over lapped layers to form a clean abutting line. The edges of sheet 2 are then aligned in abutment as shown in FIGS. 3 and 4.

In the preferred embodiment depicted in the drawings the next step involves wrapping the covered mandrel with a wet narrow nylon web 8 (approximately 6 inches wide for example) under tension by rotating mandrel 4 about shaft 6. The nylon wrapped mandrel is then placed into a heating apparatus such as autoclave 10 and heated from about 220° F. to 250° F. The nylon web shrinks during heating to cure the first layer of polyurethane.

Figure 9:
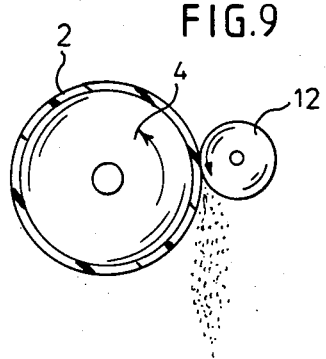
FIG. 9 is a side section view illustrating grinding of the cured polyurethane sheet.
Figure 8:
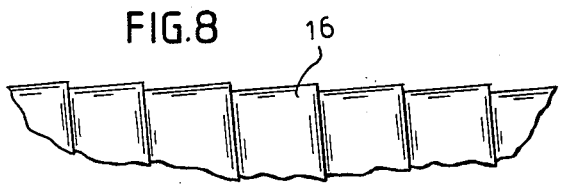
FIG. 8 is a close-up view of the surface of the cured sheet polyurethane after heating.

FIG. 7 shows the unwinding of the nylon web after removal from autoclave 10. FIG. 8 is a close-up view of the surface of the cured layer of polyurethane 16, which is uneven. FIG. 9 shows the step of grinding the surface to smooth it, using a grinder 12.

Figure 10:
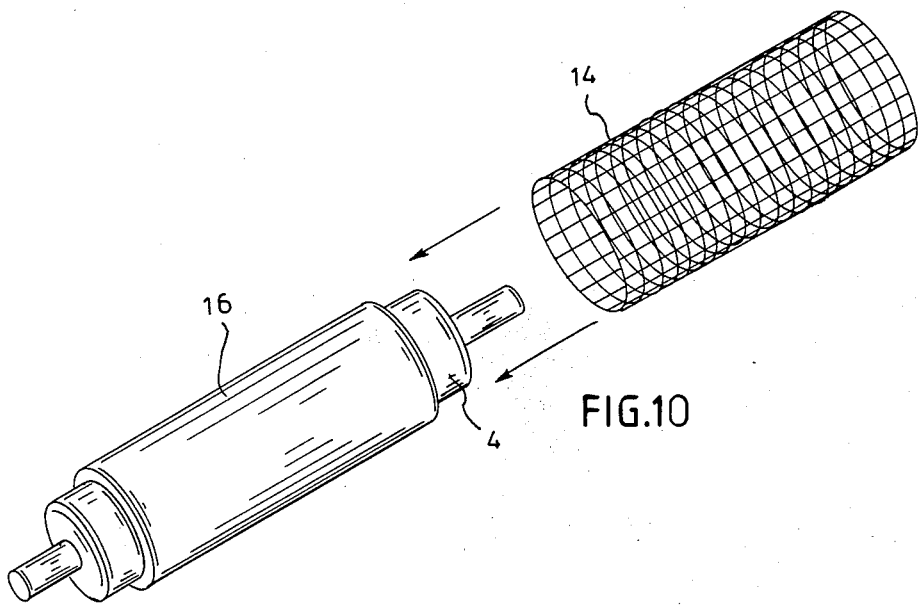
FIG. 10 is a perspective view illustrating placing a woven fabric sleeve onto the covered mandrel.
Figure 11:
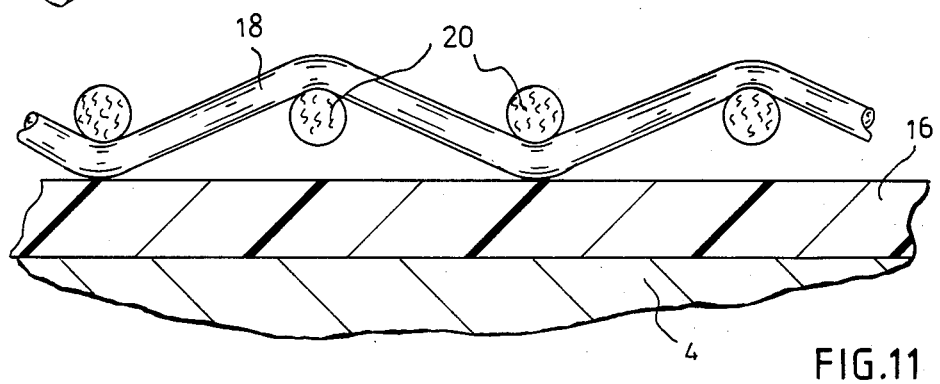
FIG. 11 is a partial front section view illustrating the woven fabric sleeve threads contacting the sheet of cured polyurethane mounted on the mandrel.

FIG. 10 illustrates a woven fabric sleeve 14 being placed on the coated mandrel. Fabric sleeve 14 preferably contains shrinkable fibers and is approximately 1% to 2% larger in inner circumference than the outer circumference of the mandrel. Hot air is used to shrink the fabric sleeve onto the urethane wrapped mandrel surface so that the fibers of the sleeve contact the layer of cured urethane 16. The fabric sleeve contains transverse fibers 18 and 20 in order to provide structural stability to the belt in two directions.

Figure 12:
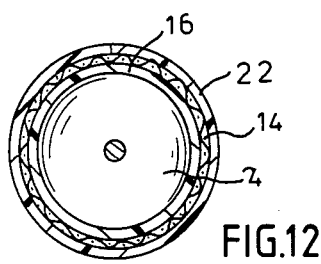
FIG. 12 is a side section view illustrating a second sheet of uncured polyurethane wrapped onto the fabric sleeve.

After fabric sleeve 14 is snugly fit a second layer of uncured sheet urethane 22, substantially the same as the first layer applied, is wrapped around the building mandrel as shown in FIG. 12.

Figure 13:
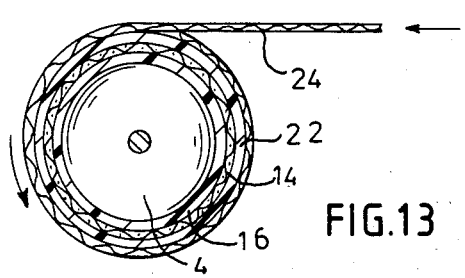
FIG. 13 is a side section view illustrating wrapping a nylon web on the covered mandrel shown in FIG. 12.
Figure 14:
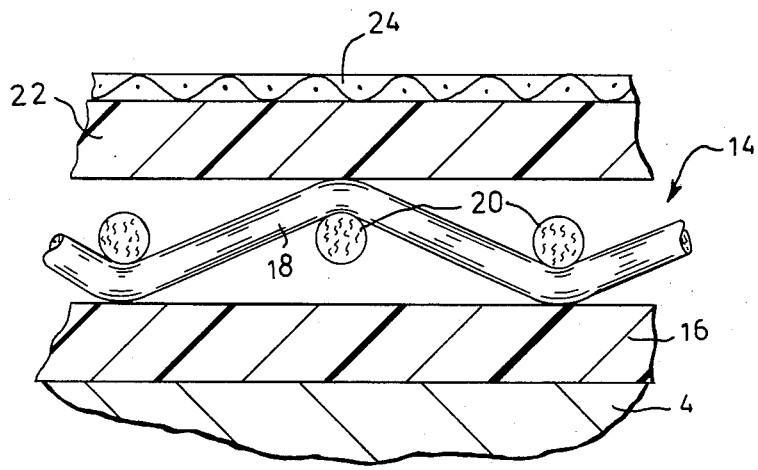
FIG. 14 is a partial front section view illustrating the mandrel of FIG. 13 after wrapping of the nylon web.

Next, once again a narrow wet nylon webbing 24 is wrapped around the entire composite as shown in FIG. 13. FIG. 14 presents a front section view showing mandrel 4, the cured first layer of urethane 16, fabric sleeve 14, the second uncured urethane layer 22 and nylon webbing 24.

Figure 15:
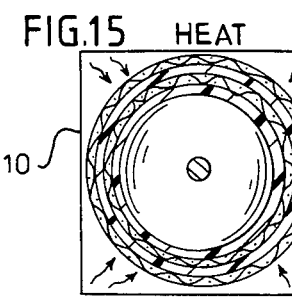
FIG. 15 illustrates heating of the covered mandrel after the wrapping illustrated in FIG. 13.

Once again the nylon wrapped composite is heated in autoclave 10 as illustrated in FIG. 15. The wet nylon webbing shrinks during the heating operation providing pressure. As a result of the heating and pressure the second layer 24 of urethane cures and bonds entirely to cured layer 16, encapsulating fabric sleeve 14.

Figure 16:
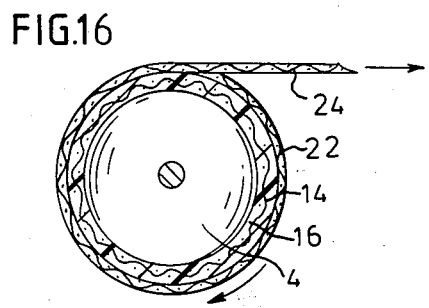
FIG. 16 is a side section view of the step of unwrapping the nylon web after curing.
Figure 17:
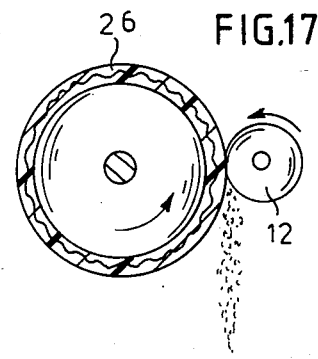
FIG. 17 is a side section view of grinding of the surface of the cured sheet polyurethane.

Once cured, the nylon webbing 24 is removed as illustrated in FIG. 16. Next the entire outside surface of the cured urethane is ground by grinder 12 to attain a smooth outer surface and to attain uniform thickness of urethane.

Figure 18:
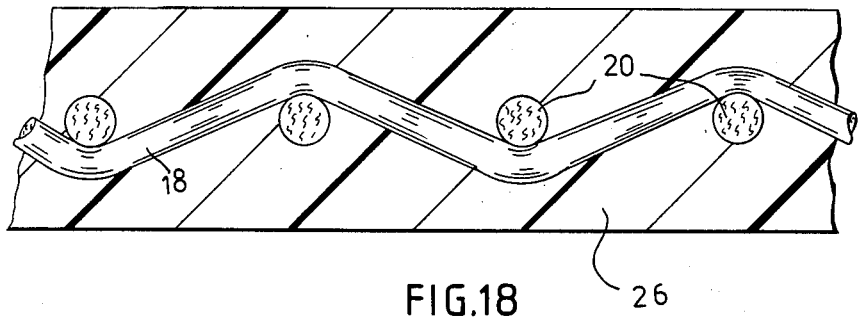
FIG. 18 is a partial front section view of a completed belt made according to the present invention.

FIG. 18 illustrates the continuous cured urethane portion encapsulating fabric sleeve 14 in the final product, belt 28. Belt 28 is removed from mandrel 4 preferably by introducing compressed air between the outer surface of the mandrel and the inner surface of the belt. A release agent may be applied to the polished mandrel at the start of the wrapping process if desired to facilitate removal of the belt.

The highly polished surface of mandrel 4 has been transmitted to the inner surface of the subject belt and is of a quality equal to if not superior, to that of prior art belts. In addition, the belt does not have to be inverted. Moreover, the belt is supported in both machine and cross machine directions by the fabric sleeve.

While a detailed description of the invention is provided it should be understood that many modifications of the above described process fall within the concept of the present invention. For example it would be possible to practice the present invention without the steps involving curing of the first layer of urethane, but rather cure both layers in the manner described and shown in one final step. Other variations exist. The scope of the invention is to be determined by the claims which follow.

What is claimed is:

1. A method of making a belt for using in papermaking comprising:
   providing a mandrel having a polished smooth surface;
   wrapping a first layer of uncured sheet urethane around the mandrel surface;
   wrapping a shrinkable web around the first layer;
   curing the first layer by heating wherein the shrinkable web applies pressure to the first layer during heating;
   unwrapping the shrinkable web and removing it from the cured first layer;
   grinding the surface of the cured first layer to smooth it;
   placing a woven fabric sleeve having fibers in transverse directions for two-directional support onto the cured first layer;
   wrapping a second layer of uncured sheet urethane over the fabric sleeve;
   wrapping a shrinkable web around the uncured second layer;
   heating the wrapped mandrel to cure the second layer and to entirely bond the first and second layers, encapsulating the fabric sleeve;
   remove the shrinkable web;
   grinding the surface of the cured urethane to smooth it and to provide a bonded layer of cured urethane of uniform thickness; and
   removing the belt, comprising the bonded layer of cured urethane encapsulating the fabric sleeve, from the mandrel.

2. A method according to claim 1 wherein the step of placing a woven fabric sleeve onto the cured first layer comprises placing a shrinkable woven fabric sleeve onto the cured first layer and a further step comprises shrinking the shrinkable woven fabric sleeve tightly onto the cured first layer.

3. A method according to claim 1 wherein the shrinking of the fabric sleeve is accomplished by hot air heating.

4. A method according to claim 1 wherein the steps of wrapping a shrinkable web comprise winding a narrow wet nylon web under tension onto the layer of urethane.

5. A method according to claim 1 wherein the steps of wrapping first and second layers of uncured sheet urethane around a mandrel further comprise overlapping the forward edge of the sheet, cutting through the overlapping portion to create a new common edge for the under and overlapped portion of the sheet, and abutting the edges to form a continuous, uniform sheet covering.

6. A method according to claim 1 further comprising applying a release agent to the polished mandrel prior to wrapping the first layer of urethane thereon, and introducing compressed air between the polished mandrel surface and the inner surface of the cured urethane to facilitate the step of removing the belt.

7. A method according to claim 1 wherein the steps of curing the first layer and heating the wrapped mandrel to cure the second layer comprise placing the wrapped mandrel into an autoclave and heating from 220° F. to 250° F.

* * * * *